(12) United States Patent
Lin et al.

(10) Patent No.: US 9,188,689 B2
(45) Date of Patent: Nov. 17, 2015

(54) REVERSE TIME MIGRATION MODEL DIP-GUIDED IMAGING

(71) Applicant: WESTERNGECO L.L.C., Houston, TX (US)

(72) Inventors: Kui Lin, Houston, TX (US); Igor Borodin, Katy, TX (US); Leonid Dovgilovich, Dolgoprudny (RU); Vasily Baydin, Sneginsk (RU); Ivan Sofronov, Moscow (RU)

(73) Assignee: WesternGeco L.L.C., Houston, TX (US)

( * ) Notice: Subject to any disclaimer, the term of this patent is extended or adjusted under 35 U.S.C. 154(b) by 504 days.

(21) Appl. No.: 13/725,154

(22) Filed: Dec. 21, 2012

(65) Prior Publication Data

US 2013/0182538 A1    Jul. 18, 2013

Related U.S. Application Data

(60) Provisional application No. 61/585,705, filed on Jan. 12, 2012.

(51) Int. Cl.
*G01V 1/28* (2006.01)

(52) U.S. Cl.
CPC . *G01V 1/282* (2013.01); *G01V 1/28* (2013.01); *G01V 2210/51* (2013.01); *G01V 2210/679* (2013.01)

(58) Field of Classification Search
CPC ......... G01V 1/282; G01V 1/28; G01V 1/301; G01V 1/303; G01V 2210/51; G01V 2210/679

USPC ................................................ 367/53, 57, 73
See application file for complete search history.

(56) References Cited

U.S. PATENT DOCUMENTS

| 2011/0069582 A1* | 3/2011 | Nichols et al. .................. 367/53 |
| 2011/0131020 A1* | 6/2011 | Meng ............................... 703/2 |
| 2011/0228638 A1* | 9/2011 | Roberts et al. .................. 367/41 |

OTHER PUBLICATIONS

Costa et al., "Obliquity-correction imaging condition for reverse time migration," Geophysics, May-Jun. 2009, vol. 74 (3): pp. S57-S66.
Liu et al., "An effective imaging condition for reverse-time migration using wavefield decomposition," Geophysics, Jan.-Feb. 2011, vol. 76(1): pp. S29-S39.
Zhang et al., "Submission No. 3784—Practical issues of reverse time migration: true-amplitude gathers, noise removal and harmonic-source encoding," 70th EAGE Conference & Exhibition, Jun. 2008: pp. 1-5.

* cited by examiner

*Primary Examiner* — Ian J Lobo
(74) *Attorney, Agent, or Firm* — Abimbola Bukoye; Gary Gex (57) ABSTRACT

Computing systems and methods to producing a reverse time migration model dip-guided image using processed vertical seismic profile data are provided. In one embodiment, vertical seismic profile data for a subsurface geological formation is obtained. One or more dip estimates corresponding to the subsurface geological formation are also obtained. One or more model dip-guided reverse time migration imaging conditions are determined and applied to the obtained vertical seismic profile data to produce the processed vertical seismic profile data.

12 Claims, 7 Drawing Sheets

REVERSE TIME MIGRATION MODEL DIP-GUIDED IMAGING

CROSS-REFERENCE TO RELATED APPLICATION

This application claims the benefit of U.S. Provisional Patent Application No. 61/585,705 filed Jan. 12, 2012, which is incorporated herein by reference in its entirety.

BACKGROUND

In situations involving complex structures and steeply dipping reflectors often found in complicated subsurface geological formations such as those in and below salt flanks, current ray-based migration methods have significant limitations due to waveform multi-pathing, including caustic and prismatic waves. Reverse time migration (RTM), however, can better handle those complicated wavepaths by correlating wave fields that are properly propagated forward in time for sources and backward in time for receivers. Two drawbacks of RTM when applied to a surface seismic profile (SSP) are: (1) imaging artifacts from backscattering; and (2) unbalanced amplitudes. Those undesirable effects can be removed or reduced by applying: (1) a Laplacian filter; (2) an imaging condition; and (3) an obliquity compensation factor.

Figure 1A:
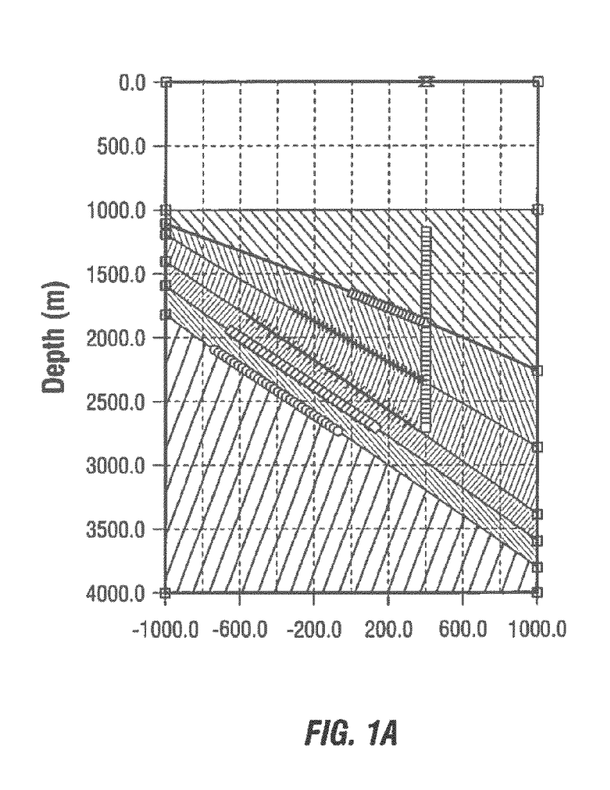
FIG. 1A illustrates a vertical seismic profile (VSP) having a particular survey geometry.
Figure 1B:
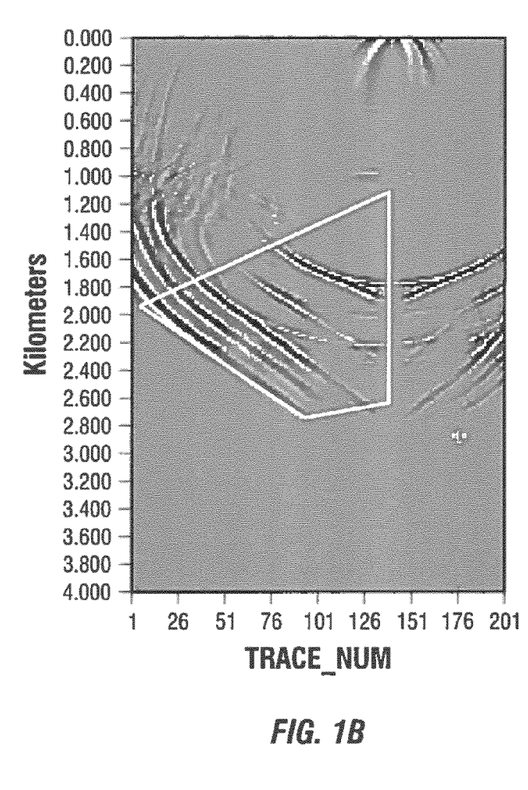
FIG. 1B illustrates a processed region of interest of the RTM image corresponding to the VSP of FIG. 1A.

For a vertical seismic profile (VSP), RTM imaging artifacts may also arise from limited aperture and data coverage. Such artifacts cannot be eliminated using the above-mentioned filters since one cannot compute such filters from VSP data alone. To illustrate, FIG. 1A shows a 2-D VSP survey and corresponding survey geometry, and FIG. 1B shows an RTM image computed using synthetic data that was generated using the survey geometry of FIG. 1A. In FIG. 1A, the "X" at the surface (zero depth) represents the source position and the receivers are distributed directly below in a vertical borehole from 1200 meters to 2700 meters. The heavy bars on the layer (acoustic impedance) boundaries indicate the portions of those boundaries for which data can be collected for the given source/receivers configuration. In FIG. 1B, the image area bounded by the superposed quadrilateral represents the portion of the subsurface formation that the VSP data can cover. Thus, all the plot features outside that region are considered imaging artifacts that should be suppressed. In addition, even within the targeted (i.e., interior) region, there are other artifacts (e.g., "swing" artifacts) that do not correspond to real spatial reflectors.

SUMMARY

In accordance with some embodiments, a method is performed that includes: obtaining vertical seismic profile data for a subsurface geological formation; obtaining one or more dip estimates corresponding to the subsurface geological formation; determining one or more model dip-guided reverse time migration imaging conditions; applying the one or more model dip-guided reverse time migration image conditions to the obtained vertical seismic profile data, thereby producing processed vertical seismic profile data; and producing an image using the processed vertical seismic profile data.

In accordance with some embodiments, a computing system is provided that includes at least one processor, at least one memory, and one or more programs stored in the at least one memory, wherein the one or more programs are configured to be executed by the one or more processors, the one or more programs including instructions for: obtaining vertical seismic profile data for a subsurface geological formation; obtaining one or more dip estimates corresponding to the subsurface geological formation; determining one or more model dip-guided reverse time migration imaging conditions; applying the one or more model dip-guided reverse time migration image conditions to the obtained vertical seismic profile data, thereby producing processed vertical seismic profile data; and producing an image using the processed vertical seismic profile data.

In accordance with some embodiments, a computer readable storage medium is provided, the medium having a set of one or more programs including instructions that when executed by a computing system cause the computing system to: obtain vertical seismic profile data for a subsurface geological formation; obtain one or more dip estimates corresponding to the subsurface geological formation; determine one or more model dip-guided reverse time migration imaging conditions; apply the one or more model dip-guided reverse time migration image conditions to the obtained vertical seismic profile data, thereby producing processed vertical seismic profile data; and produce an image using the processed vertical seismic profile data.

In accordance with some embodiments, a computing system is provided that includes at least one processor, at least one memory, and one or more programs stored in the at least one memory; and means for obtaining vertical seismic profile data for a subsurface geological formation; obtaining one or more dip estimates corresponding to the subsurface geological formation; determining one or more model dip-guided reverse time migration imaging conditions; applying the one or more model dip-guided reverse time migration image conditions to the obtained vertical seismic profile data, thereby producing processed vertical seismic profile data; and producing an image using the processed vertical seismic profile data.

In accordance with some embodiments, an information processing apparatus for use in a computing system is provided, and includes means for obtaining vertical seismic profile data for a subsurface geological formation; obtaining one or more dip estimates corresponding to the subsurface geological formation; determining one or more model dip-guided reverse time migration imaging conditions; applying the one or more model dip-guided reverse time migration image conditions to the obtained vertical seismic profile data, thereby producing processed vertical seismic profile data; and producing an image using the processed vertical seismic profile data.

In some embodiments, an aspect of the invention includes one or more dip estimates derived from surface seismic profile data.

In some embodiments, an aspect of the invention includes a produced image that is a reverse time migration image.

In some embodiments, an aspect of the invention includes determining one or more model dip-guided reverse time migration imaging conditions using wave field directional information.

In some embodiments, an aspect of the invention includes using wave field directional information obtained from directionally-based vectors.

In some embodiments, an aspect of the invention includes using directionally-based vectors selected from the group consisting of phase velocity vectors, group velocity vectors, optical flow vectors, and energy flux (Poynting) vectors.

In some embodiments, an aspect of the invention includes using one or more model dip-guided reverse time migration imaging conditions that are based on an angle between a vector sum of the source and receiver directionally-based vectors ($\vec{P}_s+\vec{P}_r$) and a vector $\vec{D}_n$ that is normal to the local model dip.

In some embodiments, an aspect of the invention includes using one or more model dip-guided reverse time migration imaging conditions that are inversely proportional to the value of the determined angle.

In some embodiments, an aspect of the invention includes determining an amplitude balancing factor and applying the amplitude balancing factor to the processed vertical seismic profile data.

In some embodiments, an aspect of the invention includes using an amplitude balancing factor that is based on one half of the value of an angle between a source directionally-based vector $\vec{P}_s$ and a receiver directionally-based vector $\vec{P}_r$.

In some embodiments, an aspect of the invention includes spatially smoothing source and receiver directionally-based vectors.

This summary is provided to introduce a selection of concepts that are further described below in the detailed description. This summary is not intended to identify key or essential features of the claimed subject matter, nor is it intended to be used as an aid in limiting the scope of the claimed subject matter.

FIGURES

Embodiments of processing acquired data for geophysical interpretation are described with reference to the following figures. The same numbers are generally used throughout the figures to reference like features and components.

It should be understood that the drawings are not to scale and that the disclosed embodiments are sometimes illustrated diagrammatically and in partial views. In certain instances, details that are not necessary for an understanding of the disclosed method and apparatus or that would render other details difficult to perceive may have been omitted. It should be understood that this disclosure is not limited to the particular embodiments illustrated herein.

DETAILED DESCRIPTION

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below," "up" and "down," "upper" and "lower," "upwardly" and "downwardly," and other like terms indicating relative positions above or below a given point or element are used in this description to more clearly describe certain embodiments. However, when applied to equipment and methods for use in wells that are deviated or horizontal, such terms may refer to a left to right, right to left or diagonal relationship, as appropriate.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both, objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A system and method to perform reverse time migration model dip-guided imaging are disclosed. Embodiments described in this disclosure use structural model dips to reduce or eliminate artifacts such as false structural artifacts and swing artifacts, as well as to improve and/or balance the amplitudes of migrated features in RTM images from VSP data. While this disclosure involves the procedure to accomplish reverse time migration model dip-guided imaging using vertical seismic profile (VSP) data, those of ordinary skill in the art will recognize that the various disclosed embodiments may be applied in many contexts for many types of collected data to image features in a subsurface region. The disclosed system and method may be used in conjunction with a computing system as described below.

Figure 2:
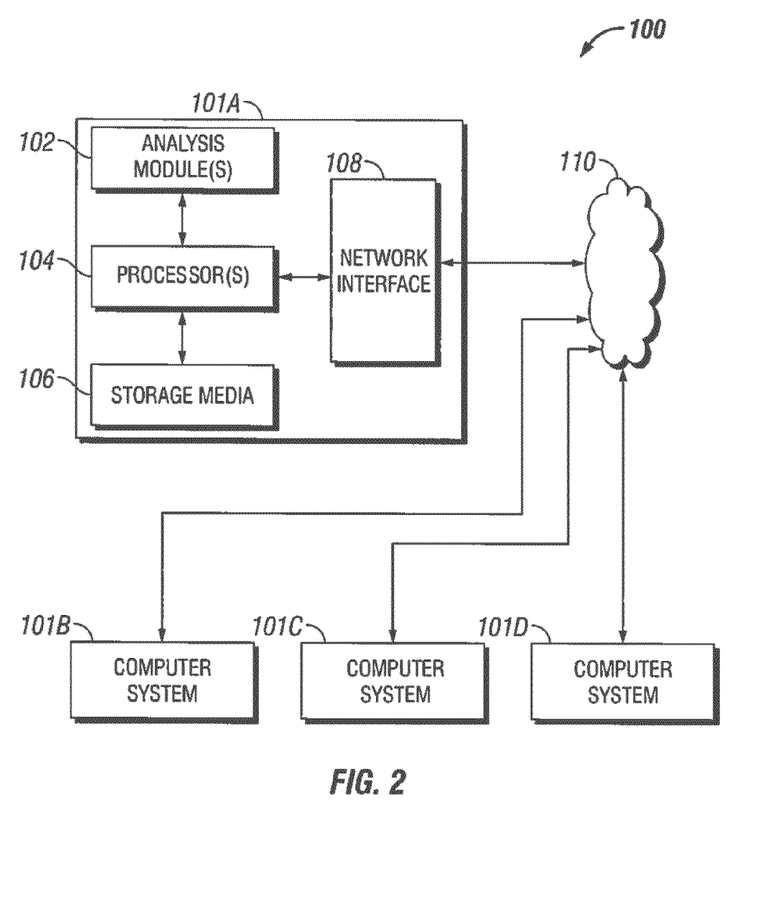
FIG. 2 illustrates an example computing system usable for one or more disclosed embodiments, in accordance with the present disclosure.

The computing system 100 shown in FIG. 2 can be an individual computer system 101A or an arrangement of distributed computer systems. The computer system 101A includes one or more analysis modules 102 that are configured to perform various tasks according to some embodiments, such as one or more methods disclosed herein (e.g., any of the steps, methods, techniques, and/or processes, and/or combinations and/or variations and/or equivalents thereof). To perform those various tasks, analysis module 102 operates independently or in coordination with one or more processors 104 that is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C, and/or 101D may or may not share the same architecture as computer system 101A, and may be located in different physical locations, e.g. computer systems 101A and 101B may be on a ship underway on the ocean, while in communication with one or more computer systems such as 101C and/or 101D that are located in one or more data centers onshore, on other ships, and/or located in various countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example embodiment of FIG. 2 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs), digital video disks (DVDs), BluRays, or other optical media; or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the example embodiment of FIG. 2, and/or computing system 100 may have a different configuration or arrangement of the components depicted in FIG. 2. For example, though not shown explicitly, computing system 100 would generally include input and output devices such as a keyboard, a mouse, a display monitor, and a printer and/or plotter. The various components shown in FIG. 2 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs or other appropriate devices. These modules, combinations of these modules, and/or their combination with general hardware are all included within the scope of this disclosure.

Attention is now directed to processing procedures, methods, techniques, and workflows that are in accordance with some embodiments. Some operations in the processing procedures, methods, techniques, and workflows disclosed herein may be combined and/or the order of some operations may be changed. It is important to recognize that geologic interpretations, sets of assumptions, and/or domain models such as velocity models may be refined in an iterative fashion. This concept is applicable to the processing procedures, methods, techniques, and workflows discussed herein. This iterative refinement can include use of feedback loops executed on an algorithmic basis, such as at a computing device (e.g., computing system 100, FIG. 2), and/or through manual control by a user who may make determinations regarding whether a given step, action, template, or model has become sufficiently accurate for the evaluation of the subsurface three-dimensional geologic formation under consideration.

In accordance with some embodiments, processing procedures, methods, techniques, and workflows are disclosed that include attenuating migration artifacts in RTM images from VSP data.

Conventionally, some RTM imaging conditions may be expressed by:

$$I(x) = \int_{x_s} \int_{x_r} \int_o^{t_{max}} p_s(x,t;x_s) p_r(x,t;x_r) dt. \tag{1}$$

That is, the RTM default imaging condition cross-correlates source and receiver wave fields that are simulated by finite difference based wave equation propagation. The first factor under the integral, $p_s$, represents the source wave field and the second factor, $p_r$, represents the receiver wave field. The function notation indicates both wave fields are functions of space and time ("x" actually represents three space dimensions), and the subscripted "$x_s$" and "$x_r$" indicate there are various sources and receivers being considered and over which the integrals are performed.

Figure 3:
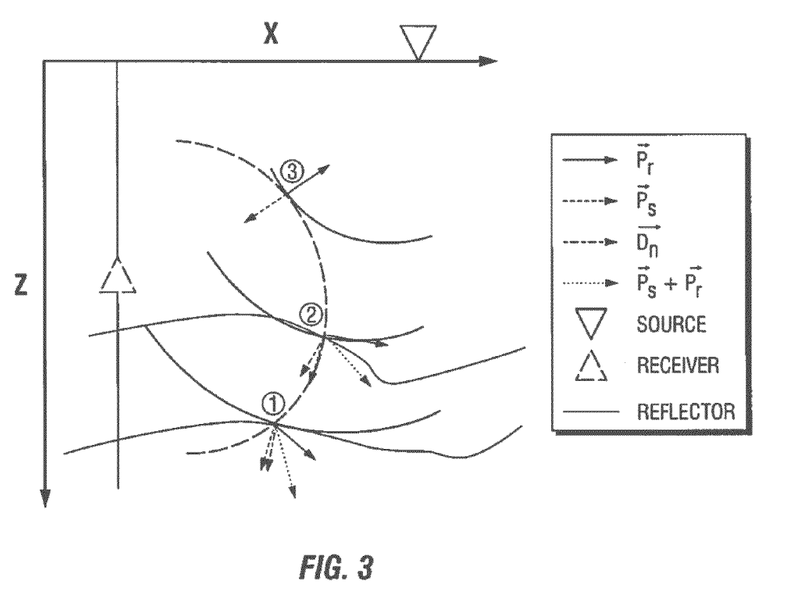
FIG. 3 schematically demonstrates certain directivity and geometric considerations in RTM for VSP, in accordance with the present disclosure.

The above formula gives equal weighting to the product of source wave field $p_s$ and receiver wave field $p_r$ at any image point, at any time step, for any source and receiver pair; and the formula does not consider the source and receiver wave field directions. The effect of those two aspects can be demonstrated by the simple survey setup of one source and one receiver, as shown in FIG. 3. The source is located as indicated by the downward pointing triangle on the x-axis, and the receiver is located as indicated by the upward pointing triangle slightly offset from the z-axis. The source wave field is represented by the three concave-up, downwardly progressing circular arcs and the receiver wave field is represented by the concave-left, semi-circular arc. Two reflectors are shown on the plot and three particular points (1, 2, and 3) are selected in the image domain.

At the three points selected in the image domain, $p_s$ and $p_r$ have significant amplitudes. Thus, their product will produce an image with comparable amplitude. However, only point 1 on the bottom reflector is detectable with this survey geometry. The other two are either non-detectable because of reflection angle limits (i.e., the reflected signal at point 2 propagates in a direction that cannot be detected by the receiver), or the point is not a true reflection point at all (i.e., point 3 is not on a reflector and thus comprises only transmitted signal).

To suppress the unwanted image artifacts, one may give appropriate weighting to the product of $p_s$ and $p_r$ to retain the image amplitude at point 1 and attenuate the image amplitudes at points 2 and 3. To that end, one may use directional information related to the wave field propagation. For example, one may use directionally-based quantities such as the wave field phase velocity vectors, group velocity vectors, or energy flux (Poynting) vectors. A further example of a directional information source is a motion constraint equation that uses an optical flow vector, and is normally expressed as:

$$\nabla I \cdot v = -\frac{\partial I}{\partial t}. \tag{2}$$

"I" represents the image and "v" represents a motion vector (optical flow vector). Thus, the scalar (i.e., dot) product of the gradient of I and v is equated to the negative of the partial derivative of I with respect to time, t.

In accordance with some embodiments, alternative RTM imaging conditions, referred to herein as model dip-guided RTM imaging conditions, may be expressed, calculated, derived, and/or estimated by:

$$I(x) = \int_{x_s} \int_{x_r} \int_0^{t_{max}} W_{dip}(\vec{P}_s, \vec{P}_r) p_s(x, t; x_s) p_r(x, t; x_r) dt. \tag{3}$$

The vectors $\vec{P}_s$ and $\vec{P}_r$ refer to the directionally-based vectors. For ease of discussion, we will refer to those vectors as Poynting vectors, though they are not limited to just energy flux. In at least one embodiment, they may be expressed as:

$$\vec{P}_s = -\dot{p}_s(x, z, t) \nabla p_s(x, z, t) \text{ and } \vec{P}_r = -\dot{p}_r(x, z, t) \nabla p_r(x, z, t). \tag{4}$$

These vectors correspond to group velocity vectors and they are normal to their respective wave fronts. At the detectable reflection point 1, the source and receiver Poynting vectors form a relatively small open angle, and their summation vector, $(\vec{P}_s + \vec{P}_r)$, is more closely aligned with the vector $\vec{D}_n$ that is normal to the local model dip than the summation vector corresponding to $\vec{P}_s$ and $\vec{P}_r$ at the non-detectable reflection point 2 is to the vector $\vec{D}_n$ normal to the local model dip at that point. At point 3 in the overburden, $\vec{P}_s$ and $\vec{P}_r$ point in opposite directions, producing a (relatively large) 180 degree open angle.

Using the angle information derived from the Poynting vectors, we can determine the model dip-guided RTM imaging condition. The weighting factor $W_{dip}$ is referred to herein as the "model dip-guided filter". A difference between conventional RTM imaging conditions, such as those expressed in Eq. (1), and the model dip-guided RTM imaging condition embodiments disclosed herein, is the addition of the model dip-guided filter, $W_{dip}$.

Figure 4:
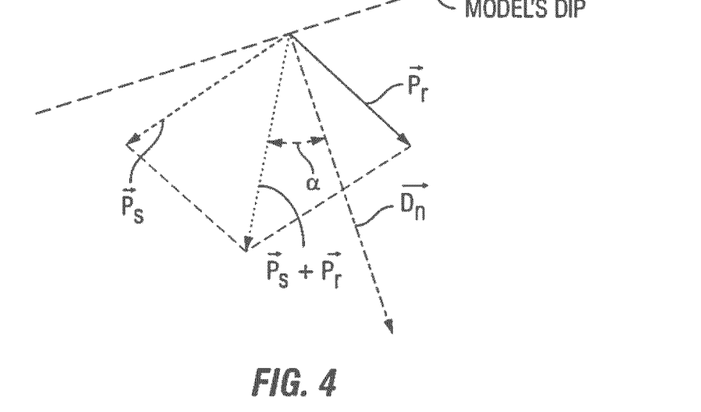
FIG. 4 schematically shows the angle α, in accordance with the present disclosure.

The dip filter design can be analogous to the dip filter design used in VSP ray-based migration. For example, the value of the weighting factor $W_{dip}$ may be inversely proportional to the value of the angle α shown schematically in FIG. 4, wherein α is the angle between the vector $\vec{D}_n$ (i.e., vector normal to the local model dip) and the summation vector $\vec{P}_s + \vec{P}_r$.

A motivation for using structural model dips stems from a difference between vertical seismic profile (VSP) and surface seismic profile (SSP) data imaging. In VSP processing, one usually has earth model representations available that are based on surface seismic image interpretation. The SSP interpretation can provide good estimates of structural dip. This model dip information can be used to filter undesirable events during migration.

An alternative of the model dip-guided RTM imaging conditions of Eq. (3) may be expressed, calculated, derived, and/or estimated by Eq. (5):

$$I(x) = \int_{x_s} \int_{x_r} \int_0^{t_{max}} W_{dip}(\vec{P}_s, \vec{P}_r) \frac{\partial p_s(x, t; x_s)}{\partial t} \frac{\partial p_r(x, t; x_s)}{\partial t} dt. \tag{5}$$

Figure 5:
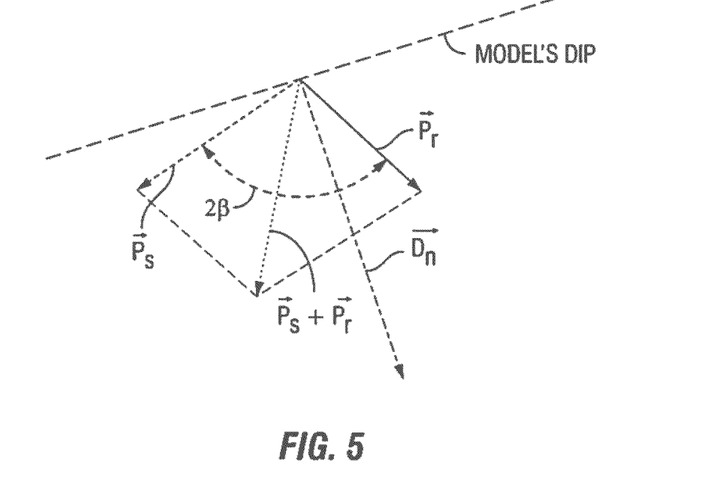
FIG. 5 schematically shows the angle 2β, in accordance with the present disclosure.

If desired, one may also apply an obliquity compensation factor, $W_{PV}$. The obliquity compensation factor is also known as an "amplitude balancing" factor. It provides geometry dependent amplitude compensation. The obliquity compensation factor can be estimated, calculated, and/or derived using the techniques schematically depicted in FIG. 5. The angle between the Poynting vectors $\vec{P}_s$ and $\vec{P}_r$ is shown as 2β. In at least one embodiment, β, or one half of the angle shown, is used to determine $W_{PV}$. In this way, small aperture reflection events in the vicinity of specular reflection points are emphasized. In some embodiments, the techniques may be analogous to those used for SSP scenarios, but the application of those techniques to VSP data is significantly different and yields unexpectedly successful results. The successful results were unexpected because of the different geometries and models involved in VSP data acquisition and data processing.

Thus, in accordance with some embodiments, alternative RTM imaging conditions such as amplitude balanced, model dip-guided RTM imaging conditions may be expressed, calculated, derived, and/or estimated by Eq. (6):

$$I(x) = \int_{x_s} \int_{x_r} \int_0^{t_{max}} W_{PV}(\vec{P}_s, \vec{P}_r) W_{dip}(\vec{P}_s, \vec{P}_r) p_s(x, t; x_s) p_r(x, t; x_r) dt. \tag{6}$$

An alternative of the amplitude balanced, model dip-guided RTM imaging conditions of Eq. (6) may be expressed, calculated, derived, and/or estimated by Eq. (7):

$$I(x) = \int_{x_s} \int_{x_r} \int_0^{t_{max}} W_{PV}(\vec{P}_s, \vec{P}_r) W_{dip}(\vec{P}_s, \vec{P}_r) \frac{\partial p_s(x, t; x_s)}{\partial t} \frac{\partial p_r(x, t; x_s)}{\partial t} dt. \tag{7}$$

Spatial smoothing of the source and receiver directionally-based vectors allows Eqs. (5) and (7) to use a smaller stencil than Eqs. (3) and (6). For example, the computations using Eqs. (5) and (7) may require only three points versus eleven points in one direction.

To reiterate the above disclosure, the construction of $W_{dip}$ in VSP applications uses the combination of: (1) (e.g., energy flux) direction of wave field propagation; (2) existing estimates of model structural dip information; and (3) geometrical considerations of detectable reflection events. The elimination of swing artifacts is achieved using this weighting factor. In addition, the amplitude balancing weighting factor $W_{PV}$ can be constructed for VSP applications using the open angles between two directional (e.g., energy flux) vectors, similar to the approach for SSP applications. The model dip-guided filter and/or the obliquity compensation factor may be created as one or more imaging conditions for use in applications for VSP data that correspond or relate to a subsurface three-dimensional geological formation.

Figure 6:
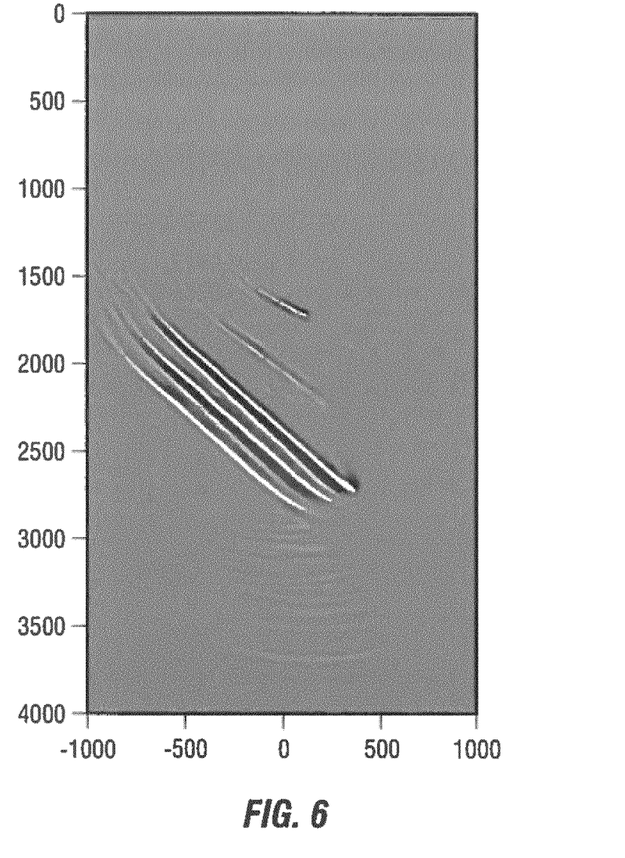
FIG. 6 illustrates model dip-guided RTM results, in accordance with the present disclosure.

Attention is now directed to two examples that compare an RTM imaging condition embodiment disclosed herein with other RTM techniques. The first case is shown in FIGS. 1B and 6. The image result computed with the RTM imaging condition embodied by Eq. (7) (shown in FIG. 6) is clearly superior to the result computed from the conventional RTM imaging condition of Eq. (1) (shown in FIG. 1B) based on the reduction or elimination of artifacts.

Figure 7A:
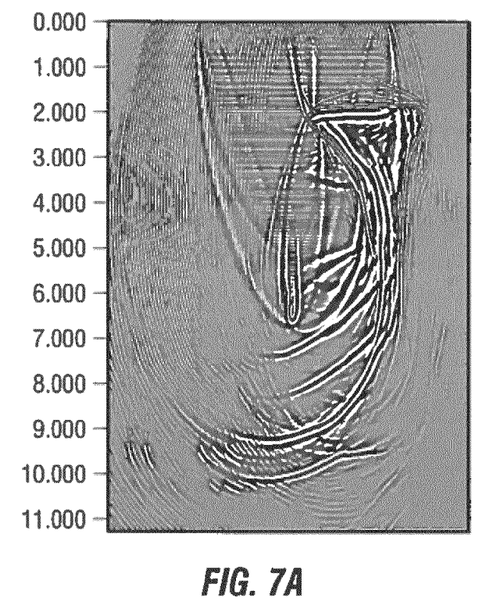
FIG. 7A illustrates conventional RTM results, as is known in the art.
Figure 7B:
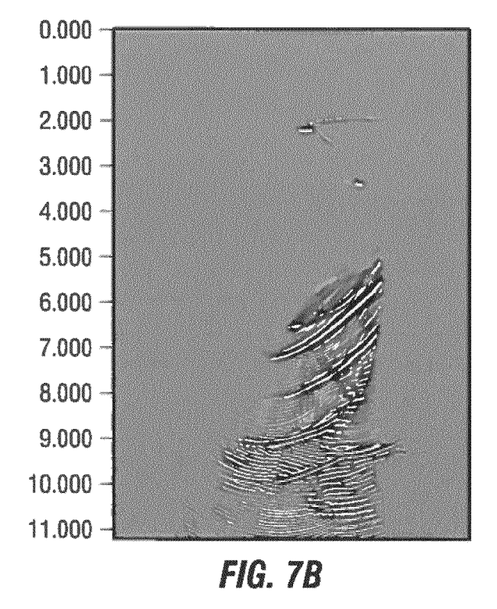
FIG. 7B illustrates model dip-guided RTM results, in accordance with the present disclosure.

The model in the second case contains high angle dipping reflectors together with a salt dome and a salt layer. The imaging results for this model are presented in FIGS. 7A and 7B. In this case, the artifacts outside the illumination area are significantly reduced (as shown in FIG. 7B) with the application of the RTM imaging condition embodied by Eq. (7).

As stated or alluded to in the Background section above, for regions characterized by complex subsurface structures, RTM is a powerful technique for accurately imaging the earth interior. However, RTM suffers from artifacts and noise produced by the conventional zero-lag imaging condition (Eq. (1)). An example of a conventional RTM image with artifacts was presented in FIG. 1B. Recall, the RTM image was computed from synthetic data that correspond to the 2-D Vertical Seismic Profile (VSP) survey geometry shown in FIG. 1A. In FIG. 1B, the polygon contains the area that could be illuminated by the VSP survey presented in FIG. 1A. Thus, all events outside of the polygon are considered artifacts. However, even inside the polygon, there are events that do not correspond to any spatial reflector features. To improve the quality of RTM images, it is desirable to suppress those artifacts.

Figure 8:
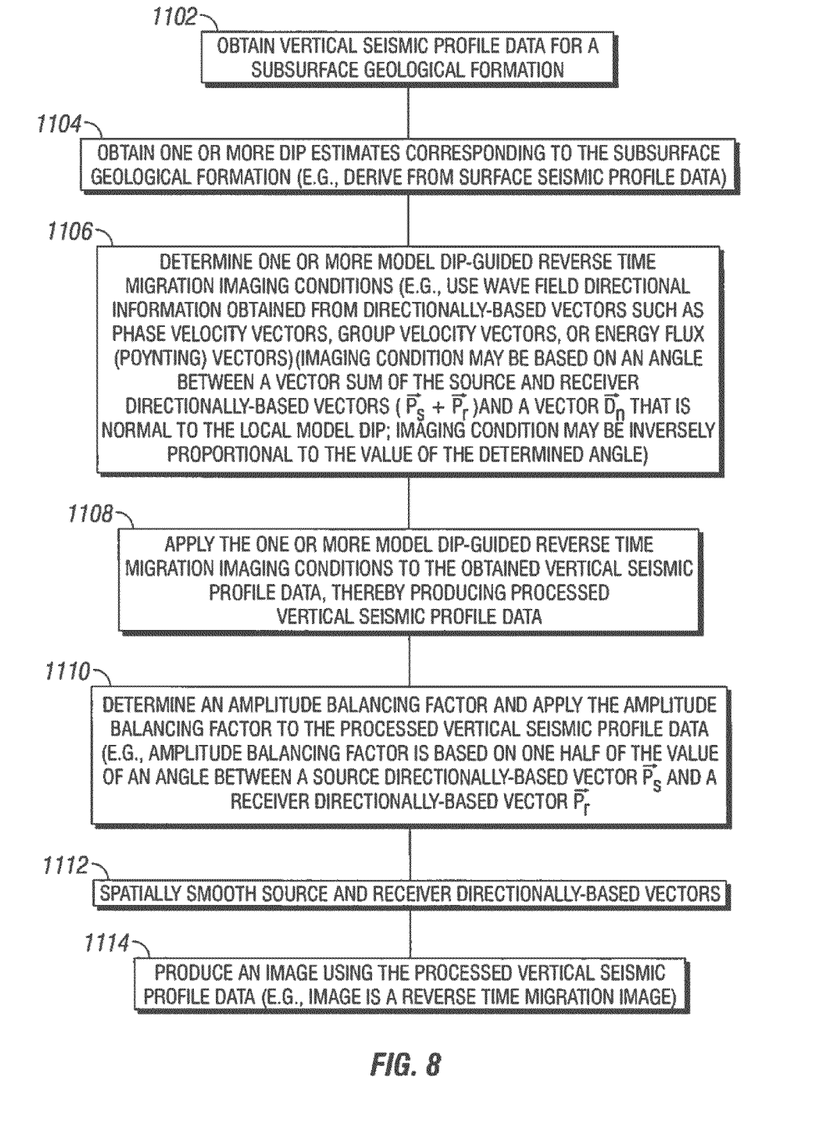
FIG. 8 is a flowchart showing possible steps for one or more embodiments, in accordance with the present disclosure.

As shown in the flowchart of FIG. 8, to obtain a reverse time migrated model dip-guided image, one may obtain vertical seismic profile data for a subsurface geological formation (1102) and one or more dip estimates corresponding to the subsurface geological formation (1104). The dip estimates may be derived, for example, from surface seismic profile data. One or more model dip-guided reverse time migration imaging conditions are determined (1106) using, for example, wave field directional information obtained from directionally-based vectors such as phase velocity vectors, group velocity vectors, or energy flux (Poynting) vectors. The imaging condition may be based on an angle between a vector sum of the source and receiver directionally-based vectors ($\vec{P}_s+\vec{P}_r$) and a vector $\vec{D}_n$ that is normal to the local model dip, and the imaging condition may be inversely proportional to the value of the determined angle. The one or more model dip-guided reverse time migration imaging conditions are applied to the obtained vertical seismic profile data, thereby producing processed vertical seismic profile data (1108). If desired, an amplitude balancing factor may be determined and applied to the processed vertical seismic profile data (1110). The amplitude balancing factor may be based on one half of the value of an angle between a source directionally-based vector $\vec{P}_s$ and a receiver directionally-based vector $\vec{P}_r$. In some embodiments one may spatially smooth the source and receiver directionally-based vectors (1112). An image may be produced using the processed vertical seismic profile data (1114). The image may be a reverse time migration image.

While certain implementations have been disclosed in the context of seismic data collection and processing, those of ordinary skill in the art will recognize that the disclosed method can be applied in many fields and contexts where data involving structures arrayed in a three-dimensional space may be collected and processed, e.g., medical imaging techniques such as tomography, ultrasound, magnetic resonance imaging (MRI) and the like, SONAR and LIDAR imaging techniques and the like.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method, comprising:
   obtaining vertical seismic profile data for a subsurface geological formation;
   obtaining one or more dip estimates corresponding to the subsurface geological formation;
   determining one or more model dip-guided reverse time migration imaging conditions;
   applying the one or more model dip-guided reverse time migration image conditions to the obtained vertical seismic profile data, thereby producing processed vertical seismic profile data; and
   producing an image using the processed vertical seismic profile data.

2. The method of claim 1, wherein the one or more dip estimates are derived from surface seismic profile data.

3. The method of claim 1, wherein the produced image is a reverse time migration image.

4. The method of claim 1, wherein the determining one or more model dip-guided reverse time migration imaging conditions comprises using wave field directional information.

5. The method of claim 4, wherein the wave field directional information is obtained from directionally-based vectors.

6. The method of claim 5, wherein the directionally-based vectors are selected from the group consisting of phase velocity vectors, group velocity vectors, optical flow vectors, and energy flux (Poynting) vectors.

7. The method of claim 6, wherein the one or more model dip-guided reverse time migration imaging conditions are based on an angle between a vector sum of the source and receiver directionally-based vectors ($\vec{P}_s+\vec{P}_r$) and a vector $\vec{D}_n$ that is normal to the local model dip.

8. The method of claim 7, wherein the one or more model dip-guided reverse time migration imaging conditions are inversely proportional to the value of the determined angle.

9. The method of claim 1, further comprising determining an amplitude balancing factor and applying the amplitude balancing factor to the processed vertical seismic profile data.

10. The method of claim 9, wherein the amplitude balancing factor is based on one half of the value of an angle between a source directionally-based vector $\vec{P}_s$ and a receiver directionally-based vector $\vec{P}_r$.

11. The method of claim 1, further comprising spatially smoothing source and receiver directionally-based vectors.

12. A computing system comprising at least one processor, at least one memory, and one or more programs stored in the at least one memory, wherein the programs comprise instructions, which when executed by the at least one processor, are configured to perform:
    obtaining vertical seismic profile data for a subsurface geological formation;
    obtaining one or more dip estimates corresponding to the subsurface geological formation;
    determining one or more model dip-guided reverse time migration imaging conditions;
    applying the one or more model dip-guided reverse time migration image conditions to the obtained vertical seismic profile data, thereby producing processed vertical seismic profile data; and
    producing an image using the processed vertical seismic profile data.

\* \* \* \* \*